United States Patent [19]

Pinney

[11] Patent Number: 4,881,438
[45] Date of Patent: Nov. 21, 1989

[54] BRUSH CUTTER BLADE

[76] Inventor: J. Dana Pinney, P.O. Box 877, Medford, Oreg. 97501

[21] Appl. No.: 124,673

[22] Filed: Nov. 24, 1987

Related U.S. Application Data

[63] Continuation-in-part of Ser. No. 929,636, Nov. 12, 1985, abandoned, which is a continuation-in-part of Ser. No. 754,761, Jul. 15, 1985, abandoned.

[51] Int. Cl.$^4$ .............................................. B27B 33/12
[52] U.S. Cl. ........................................ 83/840; 83/835
[58] Field of Search ................. 83/839, 840, 833, 834, 83/835, 841–844

[56] References Cited

U.S. PATENT DOCUMENTS

| | | | |
|---|---|---|---|
| 646,281 | 3/1900 | Hilton . | |
| 869,574 | 10/1907 | Huther . | |
| 1,988,898 | 1/1935 | Hafner | 143/141 |
| 2,947,331 | 8/1960 | Irgens | 83/834 |
| 2,958,348 | 11/1960 | Bueneman | 143/139 |
| 2,992,664 | 7/1961 | De Shano | 144/235 |
| 3,346,025 | 10/1967 | Anderson et al. | 83/833 |
| 3,425,467 | 2/1969 | Willis | 144/218 |
| 3,581,785 | 6/1971 | Neumeier | 143/135 |
| 3,745,870 | 7/1973 | Lemery | 83/833 |
| 3,929,049 | 12/1975 | Graversen | 83/834 |
| 4,348,927 | 9/1982 | Olmr | 83/833 |
| 4,563,929 | 1/1986 | Ringlee et al. | 83/840 |
| 4,590,836 | 5/1986 | Doiron | 83/834 |
| 4,627,322 | 12/1966 | Hayhurst, Jr. | 83/831 |

FOREIGN PATENT DOCUMENTS

| | | |
|---|---|---|
| 1194641 | 5/1959 | France . |
| 80528 | 5/1934 | Sweden ................... 83/840 |

Primary Examiner—Frank T. Yost
Assistant Examiner—Eugena A. Jones
Attorney, Agent, or Firm—Klarquist, Sparkman, Campbell, Leigh & Whinston

[57] ABSTRACT

A circular disk carries individual saw chain teeth riveted in alternating fashion about opposite marginal sides of the disk. The disk is of lesser thickness than the kerf cut by the teeth. The preferred cutter blade includes teeth having a wide forwardly located depth gage inclined to the path of tooth travel.

5 Claims, 2 Drawing Sheets

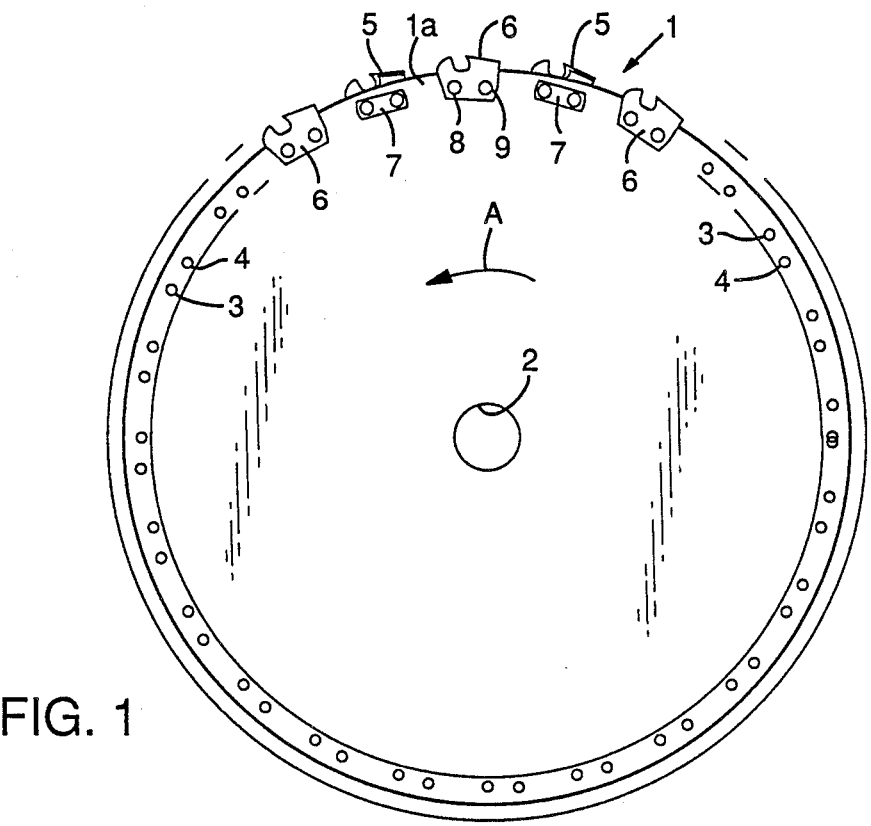
FIG. 1
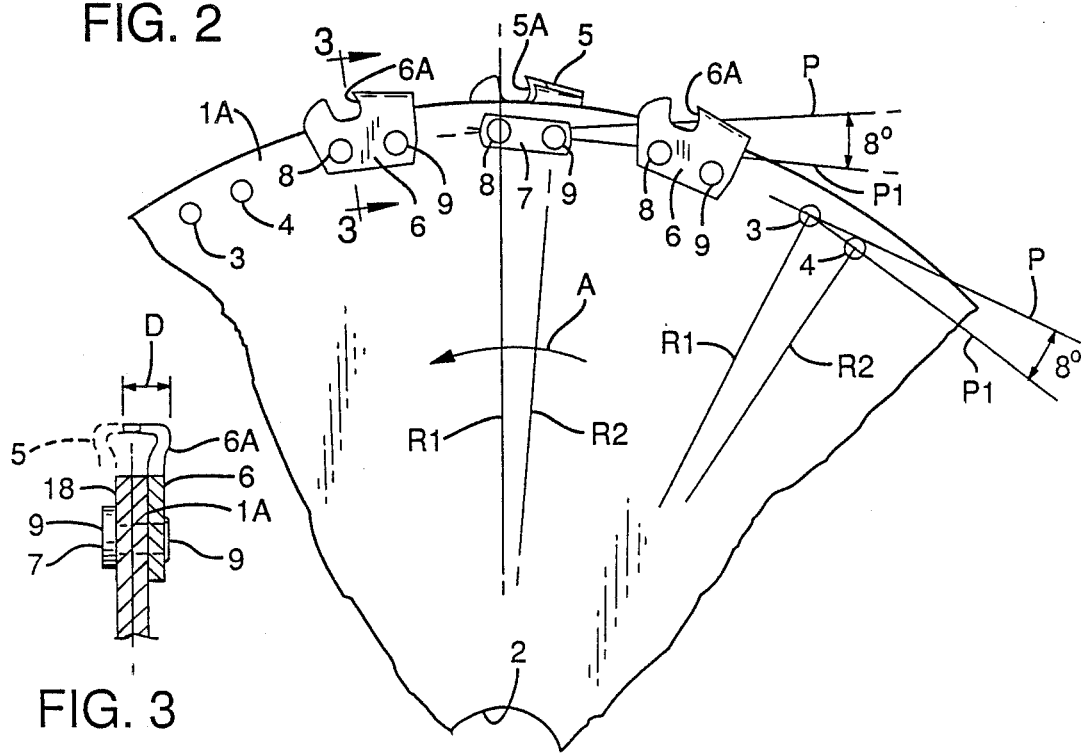
FIG. 2
FIG. 3

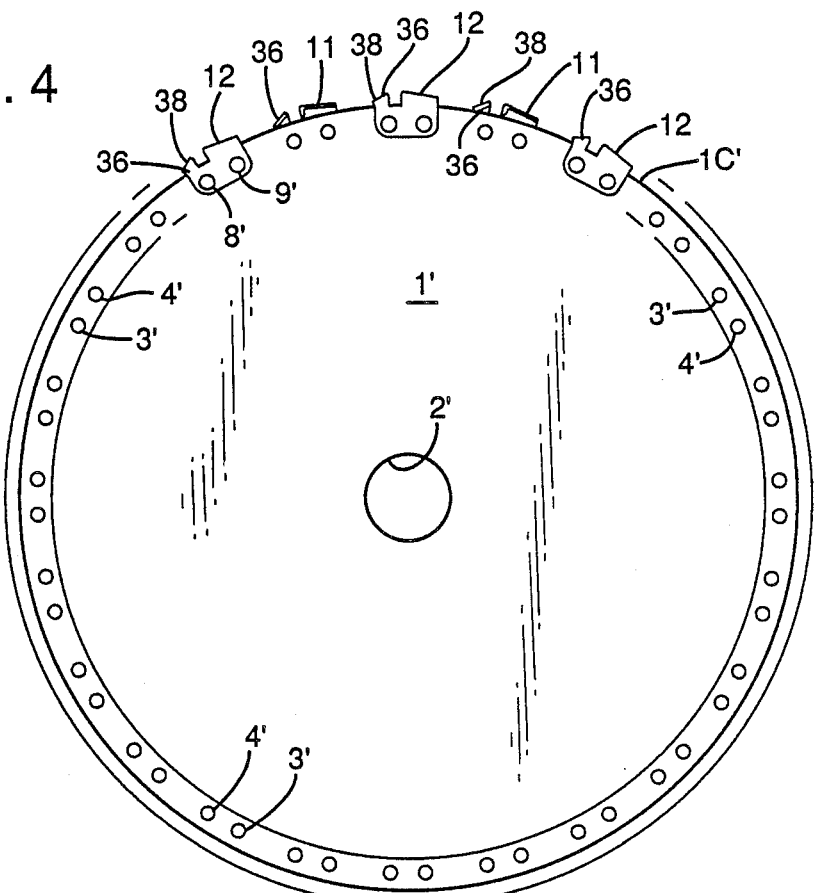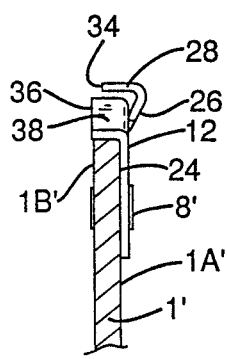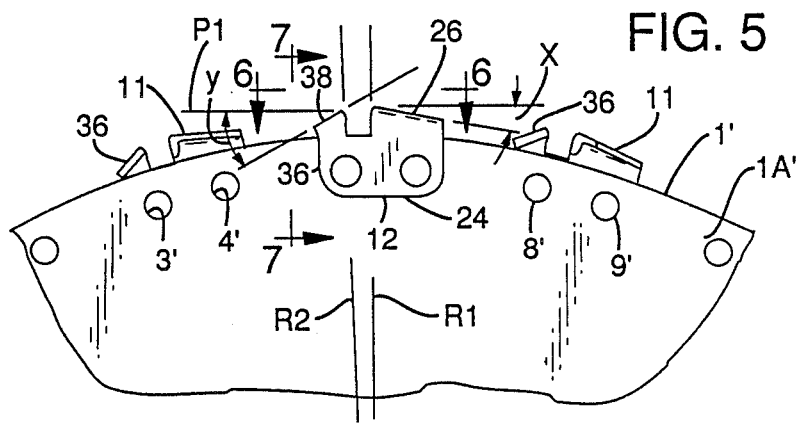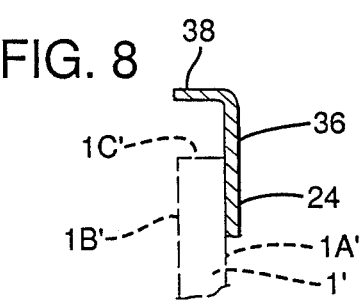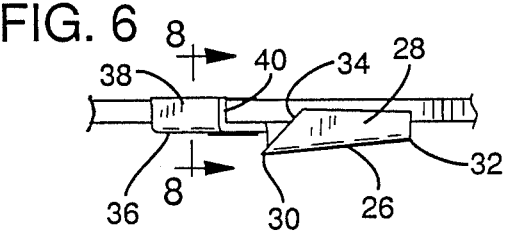

BRUSH CUTTER BLADE

BACKGROUND OF THE INVENTION

The present application is a continuation-in-part of my prior application Ser. No. 929,636 filed Nov. 12, 1986, now abandoned which was a continuation-in-part application of my copending U.S. patent application Ser. No. 06/754,761 filed July 15, 1985, now abandoned.

The present invention pertains generally to powered cutter blades for use with portable brush cutting machines in the clearing of land.

In wide use today are lightweight machines carried by the individual operators which include a small gasoline engine which drives a circular blade via a lengthy drive shaft. Such machines are used to clear land of small trees, undergrowth, brush, etc., usually in remote areas where servicing of the equipment is inconvenient. Currently in use are brush cutter blades that have teeth formed integral with the blade periphery which blades are best serviced at a saw repair facility. Accordingly it is necessary that a quantity of costly blades must be on hand in the field to prevent lost time in the event a blade is severely damaged or worn. Further, the continuous taking of blades into a facility and returning same to a remote operational site is a substantial inconvenience and costly.

In the prior art are cutter disks having saw chain teeth in place thereabout as disclosed in U.S. Pat. Nos. 2,958,348 and 3,425,467. The former patent discloses a circular disk having a radially disposed groove in its outer edge within which is carried the anchor portion of certain chain links of a continuous cutter chain. The last mentioned patent discloses a router tool having a peripheral portion of channel configuration in section to receive cutter teeth and spacer rings held in place by pins 24 terminating flush with the disk sides. French patent No. 1,194,641 discloses a circular saw blade with cutter teeth fixed to opposite sides of a circular plate, the teeth having depth gauges of the same width as the metal body of the cutter teeth. Huther, U.S. Pat. No. 869,574, and Hafner, U.S. Pat. No. 1,988,898 disclose circular discs having teeth inset into apertures formed in the blade periphery. U.S. Pat. No. 646,281 discloses a metal cutting saw having apertures about its outer margin to receive pins and setscrews to retain arcurate saw segments in place within a radially disposed groove.

Of interest is Swedish patent No. 80528 which discloses a saw blade with an outer marginal area recessed on opposite sides for the mounting of cutter elements shaped to fit within the recesses. The blade is of very costly manufacture and requires the use of cutter elements corresponding in shape to the blade recesses.

SUMMARY OF THE PRESENT INVENTION

The present invention is embodied in a disk shaped cutter blade having saw chain teeth affixed exteriorly at intervals to the blade peripheral margin.

The teeth of the present blade are of the type similar to those used on powered chain saws but presently separated from one another and secured in place, in alternating fashion, on opposite sides of the cutter disk. The teeth may be rearwardly inclined to enhance their cutting action. Blade apertures are formed in pairs to mount each tooth with the apertures of each pair being in a plane inclined to a blade radius intersecting the leading aperture of the pair of apertures. The cutting width of left-hand and right-hand teeth cutting edges are greater than disk thickness.

The teeth may be secured in place in the field with common hand tools and within a few minutes. Refurbishing in the field of a cutter disk with factory sharpened teeth greatly contributes to increased efficiency of a crew of land clearers and enables the operation to be conducted without a costly inventory of cutter blades.

Important objectives of the present cutter blade include the provision of a disk shaped cutter blade for brush clearing use which may be readily sharpened or refurbished with new teeth in the field by the machine operator; the provision of a brush cutter blade having right and left-hand kerfs; the provision of a brush cutter blade wherein teeth on the blade sides are rearwardly tipped for efficient cutting; the provision of a cutter blade particularly suited for the cutting of brush and undergrowth wherein the blade may accidentally come into contact with rocks which would severely damage conventional blades; the provision of a cutter blade of low cost manufacture using high quality and easily manufactured saw chain teeth affixed to the blade sides; the provision of a cutter blade with teeth having a guide or raker portion formed with a wide ramp surface inclined to the path of tooth travel; the provision of a cutter blade with teeth for use on portable brush cutting equipment which permits use of lighter, lower power engine on such equipment; the provision of a cutter blade with teeth which have a wide chip removing raker portion and a cutter portion providing less tooth drag.

BRIEF DESCRIPTION OF THE DRAWINGS

In the drawings:

FIG. 1 is a plan view of the present cutter blade with some blade teeth shown in phantom outline;

FIG. 2 is an enlarged fragment of the blade marginal area with cutter teeth in place;

FIG. 3 is a vertical sectional view taken along line 3—3 of FIG. 2;

FIG. 4 is a plan view similar to FIG. 1 but showing a modified cutter blade;

FIG. 5 is an enlarged fragment of a blade marginal area of blade shown in FIG. 4;

FIG. 6 is a plan view of a modified tooth taken along line 6—6 of FIG. 5;

FIG. 7 is a vertical sectional view of the modified cutter blade taken along line 7—7 of FIG. 5.

FIG. 8 is a vertical section taken along 8—8 of FIG. 6.

DETAILED DESCRIPTION OF THE PREFERRED EMBODIMENTS

With continuing reference to the drawings wherein applied reference numerals indicate parts similarly hereinafter identified, the reference numeral 1 indicates generally the present cutter disk.

The disk has a central hole 2 for the mounting of the disk on the engine powered member of a brush cutter machine.

Spaced about the peripheral planar side margins 1A–1B of the blade are pairs of apertures 3 and 4 with each pair associated with a right and left-hand tooth at 5 and 6. Aperture 3 is herein termed the leading aperture which aperture 4 is termed a trailing aperture with respect to the direction of blade rotation per arrow A.

The teeth are of the type commonly made and sold for use in chain saws with cutting edges 5A-6A. In the present use the teeth are utilized separately in spaced placement along opposite side margins 1A-1B of the blade disk.

Each tooth is preferably secured in place by a plate 7 having rivets or posts 8 and 9 which occupy blade apertures 3 and 4 and extend therebeyond for passage through the pair of openings in the oppositely mounted tooth. Such posts are of malleable metal which permits tooth securement by peening of the post ends to overlie the edges of the tooth openings. Such peening can be easily accomplished in the field. Removal of a damaged tooth may be by use of a punch.

To provide desired cutting action the teeth cutting edges extend transversely of the disk. The teeth are tipped rearwardly which is accomplished by locating the blade trailing aperture 4 on a somewhat lesser radius R2 than the radius R1 terminating at the center of leading aperture 3. The leading and trailing apertures associated with each tooth lie in a plane P1 inclined at approximately eight degrees, per FIG. 2, to a plane P which is normal to radius R1. It is to be understood that while a specific inclination is noted, the blade will function with teeth inclined within a range of five to ten degrees.

The present cutter blade may be sharpened by files heretofore used for the sharpening of chain saw teeth. Loss of a tooth or severely damaging same may be conveniently remedied by the substitution of a new tooth. A supply of teeth 5 and 6 may, of course, by conveniently carried by the user. A desirable uniform blade or disk thickness has been found to be approximately 3/32 of an inch. The transverse cutting dimension D of a typical tooth extends beyond a medial place of the blade to provide overlapping kerfs of opposite side mounted teeth. The dimension D is also greater than disk thickness in a preferred form of the invention.

In FIGS. 4 through 8 the modified and preferred cutter blade disclosed utilizes a disk 1' very similar to that described above with uninterrupted or continuous outer marginal surface areas at 1A' and 1B'. A disk outer edge is at 1C'.

Pairs of apertures at 3' and 4' are spaced about the disk cutter margin to receive rivets or posts 8' and 9' which serve to attach the later described teeth. The apertures 3' and 4' may be on equal radii of the disk.

Attached to the disk marginal surfaces 1A' and 1B' are disk abutting right and left hand teeth 11 and 12 respectively, having apertures spaced to receive posts 8' and 9'.

As the teeth 11 and 12 are mirror images of one another, a detailed description of one will suffice. The tooth 12 comprises a flat body or plate portion 24 which abuts a side surface 1A' of the disc 1'. The tooth 12 has a single cutter element comprising a reversely curved side wall portion 26 integral with the plate portion 24 and an outer flange portion 28. The side wall portion is laterally offset from the plate portion 24, the amount of offset progressively decreasing from the forward end 30 to the rearward end 32 thereof. The flange portion 28 extends from the side wall portion 26 substantially at a right angle to the disc surface 1A' across the median plane of the disc. The forward ends of the flange portion 28 and the side wall portion 26 are formed with a beveled surface defining a continuous cutting edge 34. The flange portion 28 is inclined downwardly at an angle X of between seven and ten degrees with respect to a perpendicular to a radius R1 of the disc intersecting the forward edge of the flange portion 28.

Integral with the forward end of the plate portion 26 is a ramp or depth gauge 36 formed by bending an extension of the plate portion at right angles to such plate portion, as best seen in FIG. 8, and having an upwardly facing surface 38 sloped upwardly at an angle Y of between twenty five and thirty five degrees, preferably about thirty degrees, with respect to a plane P1 parallel to the axis of the disc 1' and normal to a radius R2 of the disc intersecting the trailing edge 40 of the depth gauge. The depth gauge surface 38 has a width of between 0.075 and 0.275 inch, preferably 0.175 inch. The specified slope and width of the depth gauge has been found to minimize "kickback" during operation of the saw and maximize the cutting efficiency. Increasing the width increases the drag and decreasing the width decreases efficiency because of undue penetration of the depth gauge into the wood being cut. The trailing edge 40 of the depth gauge is spaced below the cutting edge 34 of the flange portion between 0.025 and 0.030 inch to provide clearance for penetration of the flange cutting edge into the material being cut, but preventing over penetration.

The tooth configuration described enables a disc cutter with a diameter of about 8.5 inches to cut brush and small trees efficiently and with a minimum of vibration and chatter and without overloading the small displacement motors used in brush cutting devices.

While I have shown but a few embodiments of the invention, it will be apparent to those skilled in the art that the invention may be embodied still otherwise without departing from the spirit and scope of the invention.

Having thus described the invention, what is desired to be secured in a Letters Patent is:

I claim:

1. A brush cutting blade for a motor driven brush cutting machine, said blade comprising,
   a circular disc having opposite planar parallel side surfaces and a smooth continuous periphery,
   and a plurality of cutter teeth individually attached to the peripheral margin of said disc,
   said teeth being of alternating left and right configuration and being mounted in peripherally spaced relation alternately on opposite sides of said disc
   each of said teeth comprising a flat plate portion abutting a side surface of said disc,
   fastener means extending through each of said tooth plate portions and said disc rigidly to secure said teeth to said disc,
   each of said teeth having a single cutter element consisting of a side wall portion integral with said plate portion and an outer flange portion,
   said side wall portion being laterally offset from said plate portion, the amount of offset progressively decreasing from the forward end to the rearward end thereof,
   said flange portion extending from said side wall portion substantially at right angles to disc side surfaces across the median plane of said disc,
   said flange portion being inclined downwardly at an angle of between seven and ten degrees with respect to a perpendicular to a radius of said disc intersecting the forward edge of said flange portion, the forward edge of said side wall portion and said flange portion of each cutter element being formed with a beveled surface defining a cutting edge, and a depth gauge integral with the forward end portion of each tooth plate portion positioned forwardly of said cutter element, said depth gauge defining an upwardly facing flat surface sloping upwardly from its forward to its rearward edge at an angle of between twenty-five and thirty-five degrees with respect to a plane parallel to the axis of said disc and normal to a radius of the disc intersecting the trailing edge of said depth gauge, said depth gauge surface having a width of between 0.075 to 0.275 inch, the top trailing edge of said depth gauge being spaced between 0.025 and 0.030 inch below the cutting edge of said flange portion.

2. A cutting blade as set forth in claim 1 wherein said depth gauge has a width of 0.175 inch.

3. A cutting blade as set forth in claim 1 wherein said depth gauge slopes at an angle of thirty degrees.

4. A cutting blade as set forth in claim 1 wherein said flange portion slopes at an angle of seven degrees.

5. A cutting blade as set forth in claim 1 wherein said cutter teeth are secured to said disc by rivets extending through said blade and teeth.

* * * * *